March 2, 1971     W. E. CLIFFORD     3,567,370
METHOD OF MAKING SYNTHETIC CRYOLITE
Filed June 29, 1969
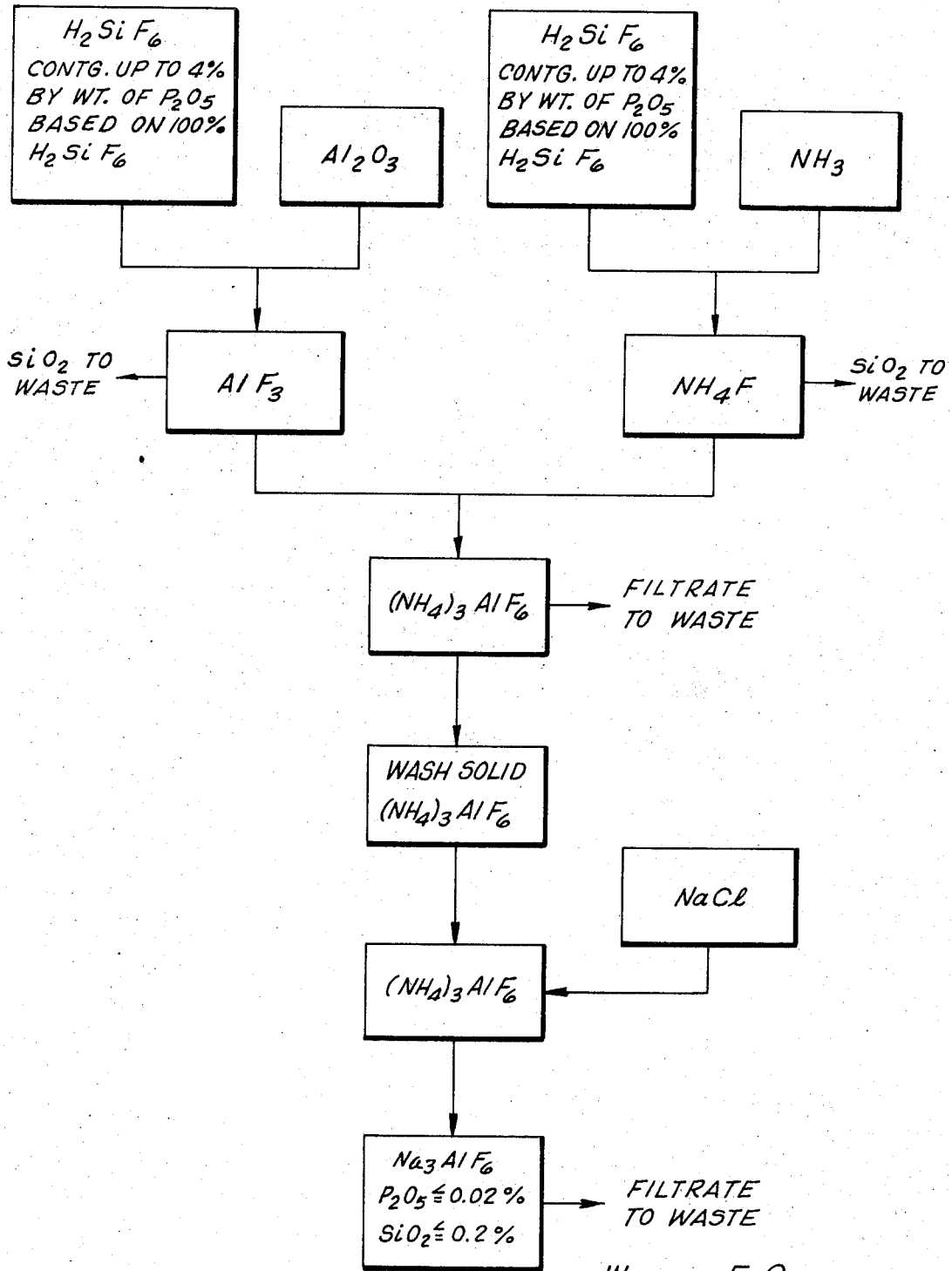
WARREN E. CLIFFORD
INVENTOR.
BY Andrew E. Barlay
ATTORNEY United States Patent Office 3,567,370
Patented Mar. 2, 1971

3,567,370
METHOD OF MAKING SYNTHETIC CRYOLITE
Warren E. Clifford, Danville, Calif., assignor to Kaiser Aluminum & Chemical Corporation, Oakland, Calif.
Filed Jan. 29, 1969, Ser. No. 795,115
Int. Cl. C01f 7/50, 7/54
U.S. Cl. 23—88                                 6 Claims

ABSTRACT OF THE DISCLOSURE

Synthetic white sodium cryolite of high purity is made from aluminum fluoride and ammonium fluoride, both compounds being prepared from impure fluosilicic acid containing up to 4% by weight of phosphatic impurities (calculated as $P_2O_5$ on the basis of 100% fluosilicic acid). The reaction product of ammonium fluoride and aluminum fluoride, i.e., ammonium cryolite, is separated from the impurities and is washed prior to metathesis with sodium chloride. The ammonium cryolite-sodium chloride reaction produces a synthetic sodium cryolite which contains less than 0.02% by weight of phosphatic impurities calculated as $P_2O_5$ and less than 0.2% by weight of $SiO_2$. Calcination of the sodium cryolite further reduces the $SiO_2$ content.

BACKGROUND OF THE INVENTION

Sodium cryolite is employed in the electrolytic production of aluminum as a fused salt electrolyte because of the solubility of alumina in the cryolite and furthermore for the good electrical conductivity of cryolite. As for every electrolytic process, it is of major importance to utilize a high purity electrolyte, since impurities in the electrolyte tend to deleteriously affect the efficiency of the electrolysis as well as the process economy.

Synthetic cryolite can be produced from the den gases of the wet phosphoric acid process, which consists of the acid decomposition of phosphate containing rock and recovery of produced phosphoric acid. One of the gaseous by-products of this process is fluorosilicic acid ($H_2SiF_6$) which is usually recovered from the den gases by absorption in water. The aqueous fluorosilicic acid produced in this manner has a phosphatic impurity level of about 4% by weight (calculated on the basis of 100% $H_2SiF_6$) and this will affect the quality of sodium cryolite produced therefrom.

In the prior art it has been suggested to employ the fluosilicic acid, obtained from the acid decomposition of phosphate rock, to produce $AlF_3$ which in turn is converted with $NH_4F$ to ammonium cryolite. The ammonium cryolite produced is then decomposed under highly acidic conditions with NaCl or $Na_2CO_3$ to obtain sodium cryolite. The purity of the produced sodium cryolite will meet the requirments set for "specification grade" cryolite, provided the pH of the ammonium cryolite-sodium cryolite conversion step is carefully controlled in such a manner as to obtain a final pH value of less than 2 in the reaction mixture after the conversion step is completed. The color of the produced sodium cryolite, however, is dependent on the final pH of the reaction mixture and if low $P_2O_5$ content, i.e. (less than 0.05%), is desired in the sodium cryolite, the product is not white, rather its color will vary from light buff to buff which seriously affects its quality. At final pH values of above 2, the color of the sodium cryolite is satisfactory; however, the $P_2O_5$ content of the cryolite will be at unacceptable levels, e.g. above 0.05% by weight. This process also requires special equipment due to the highly acidic conditions present in the final reaction mixture, as well as close control of the pH conditions prior to the conversion of the ammonium cryolite to sodium cryolite.

It has now been found that by employing the process of the present invention, a synthetic, white sodium cryolite can be made of high purity, i.e., less than 0.02% $P_2O_5$ content and less than 0.2% $SiO_2$ content without the difficulties which arise in the prior art processes.

BRIEF SUMMARY OF THE INVENTION

Synthetic, white and impurity-free sodium cryolite is produced from aqueous fluosilicic acid containing phosphatic impurities. The impure aqueous fluosilicic acid is utilized for the production of both aluminum fluoride and ammonium fluoride, which when admixed in the mole ratio of 2.85–3.15 moles of $NH_4F$ to 1 mole $AlF_3$ will produce ammonium cryolite $[(NH_4)_3AlF_6]$. The produced ammonium cryolite is then separated from the mother liquor, washed and decomposed with NaCl. The resultant sodium cryolite ($Na_3AlF_6$) possesses a white color and the phosphatic impurity level of the product is less than 0.02% by weight calculated as $P_2O_5$, and its siliceous impurity level is less than 0.2% by weight, calculated as $SiO_2$. While the produced sodium cryolite is eminently suitable for immediate utilization after drying, it can be calcined if desired to remove further amounts of $SiO_2$.

DETAILED DESCRIPTION OF THE INVENTION

The figure in the drawing represents an illustration of the process of the invention.

According to the process of the present invention for the preparation of sodium cryolite, a fluorosilicic acid solution is utilized which has been obtained from the waste gas generated by the acidulation of phosphate rock. The waste gas contains considerable quantities of fluosilicic acid, which is recovered from the gas by absorption in an aqueous medium. The resultant fluosilicic acid is contaminated with phosphatic impurities. The fluosilicic acid solution, recovered from the waste gas, usually contains from about 8 to about 25% by weight of fluosilicic acid. Fluosilicic acid concentrations of this range are suitable for accomplishing the method of the present invention; however, for economical purposes it is advantageous to employ fluosilicic acid solutions having a fluosilicic acid content of from about 12 to about 25% by weight. The fluosilicic acid obtained directly from the absorption tower, is suitable for the preparation of aluminum fluoride, which is one of the starting components in the process of the present invention. The reaction involved can be described as follows:

According to this reaction, two moles of aluminum hydroxide are added to one mole of fluosilicic acid. This reaction may be accomplished by using stoichiometric quantities of the reactants. $Al_2O_3 \cdot xH_2O$ ratios from 0.95–1.10 can be advantageously utilized. The $Al(OH)_3$ reactant for this reaction can be alumina, such as produced by the Mayer Process, or a slurry of alumina. The reaction between the aqueous fluosilicic acid and the alumina proceeds according to well-known principles, and the aqueous $AlF_3$ solution is then separated from the precipitated $SiO_2$. The produced $AlF_3$ solution can be subjected to crystallization to recover crystalline $AlF_3 \cdot 3H_2O$ or the solution containing the dissolved $AlF_3$ can be directly utilized in the present process.

The second step in the present process involves the preparation of ammonium fluoride from the same impure fluosilicic acid solution utilized for the production of $AlF_3$. The reaction involved in the preparation of $NH_4F$ is shown in Equation 2.

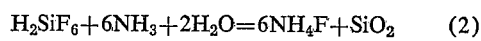

This reaction can be accomplished in a well-known manner by utilizing stoichiometric amounts of fluosilicic acid and ammonium hydroxide. It was found, however, that an excess of NH₄OH, usually up to about 6.6 moles of $NH_3$ per mole of fluosilicic acid or up to about 10–15% over the stoichiometrically required quantity will provide an improved $SiO_2$ separation and better rate of filtration for the precipitated $SiO_2$, while an excess of $H_2SiF_6$ will not only reduce the rate of filtration, but will also increase the silica content found in the filtrate. The concentration of the ammonium hydroxide used for the production of the $NH_4F$ can vary within wide limits; however, for best results $NH_4OH$ solutions containing of from 200–400 grams per liter $NH_3$ are employed. The pH, after the reaction is complete, should be between 7.5 and 9.5. Gaseous ammonia can also be utilized for this reaction, in this case, ammonia is bubbled through the aqueous $H_2SiF_6$ to produce $NH_4F$. For best results, an excess of $NH_3$ should be bubbled through the aqueous solution.

Heating of the reaction mixture will improve the rate of reaction; however, temperatures in excess of 100° C. at normal pressure will result in loss of $NH_3$, as well as in an undesirable rate of filtration for the precipitated $SiO_2$. Advantageously, digestion temperatures between about 50–85° C. are employed and within this temperature range the reaction between the fluosilicic acid and ammonium hydroxide is accomplished within a time period of about 10–30 minutes.

The produced $NH_4F$ solution is then separated from the precipitated $SiO_2$, for example, by filtration. The aqueous $NH_4F$ solution can be directly employed in the preparation of the ammonium cryolite [$(NH_4)_3AlF_6$], any excess of $NH_3$ is removed by aeration or other means.

The production of ammonium cryolite according to the method of the present invention can then proceed. The reaction involved in this process step is shown below in Equation 3

$$AlF_3 + 3NH_4F = (NH_4)_3AlF_6 \quad (3)$$

The reaction between the aqueous solutions of $AlF_3$ and $NH_4F$ can be accomplished either by simultaneously admixing the two aqueous solutions or by gradual addition of one of the reaction components. For a continuous process, however, simultaneous addition of the two solutions proved to be advantageous. The reaction between the reactants is rapid, and in less than 30 minutes at temperatures below 60° C. the formation of ammonium cryolite is complete in yields exceeding 90%. The ammonium cryolite produced precipitates from the solution and is recovered by conventional means, such as filtration or centrifuging. The precipitated ammonium cryolite is then washed with water to remove any impurities adhered to the surface of the solid ammonium cryolite. While one wash with tap water, distilled or deionized water is sufficient for the removal of surface adhered impurities, for best results at least two, preferably three washings of the solid ammonium cryolite is recommended. The produced ammonium cryolite is white in color and is substantially pure. The phosphatic impurity level is below 0.02% by weight calculated as $P_2O_5$ and the siliceous impurity level is less than 0.2% by weight calculated as $SiO_2$.

To show the different factors which influence the quality and yield of the ammonium cryolite produced according to the method of the present invention, the following discussion and tables are provided.

Effect of $NH_4F:AlF_3$ ratio on the purity of $(NH_4)_3AlF_6$

It was found that the mole ratio $NH_4F$ to $AlF_3$ does not influence the purity of the produced ammonium cryolite if the $NH_4F:AlF_3$ ratio is maintained between about 2.8–3.2 moles of $NH_4F$ to 1 mole of $AlF_3$. Within these mole ratios the purity of the produced ammonium cryolite is at maximum as shown in the table below.

TABLE 1

[Purity of Ammonium Cryolite as a Function of $NH_4F/AlF_3$ Ratio]

| Moles, $NH_4F:AlF_3$ | Ammonium cryolite,[1] dried, percent | | | Ammonium cryolite,[2] calcined | | | |
|---|---|---|---|---|---|---|---|
| | $P_2O_5$ | $SiO_2$ | F | $P_2O_5$ percent | $SiO_2$ percent | F percent | LOI[3] |
| 2.85 | 0.01 | 0.05 | 57.3 | 0.005 | 0.013 | 65.8 | 52.5 |
| 3.00 | 0.01 | 0.06 | 57.4 | 0.005 | 0.005 | 65.8 | 53.5 |
| 3.15 | 0.01 | 0.09 | 57.1 | 0.005 | 0.010 | 65.8 | 54.7 |

[1] Dried at 120° C.
[2] Calcined at 700° C.
[3] LOI = loss on ignition.

Effect of reaction temperature on ammonium cryolite yield

It was found that the reaction temperature will influence the yield of ammonium cryolite produced. The reaction between $NH_4F$ and $AlF_3$ is exothermic producing about 21 kcal. per mole of $(NH_4)_3AlF_6$ produced. The exothermic nature of the reaction must be taken into account and for best results the temperature of the reaction mixture should not exceed 90° C., preferably 70° C. At reaction temperatures between about 25–70° C., the yield of the produced ammonium cryolite will be maximal. Advantageously the formation of the ammonium cryolite is accomplished by admixing the solutions at temperatures between 40–60° C. followed by a short digestion period of about 10–15 minutes at temperatures between 25–40° C. Digestion at temperatures below 40° C. increases the yield.

In accordance with the method of the present invention, the washed, solid ammonium cryolite is then converted to the desired sodium cryolite. This conversion or metathesis of the ammonium cryolite is accomplished by admixing the ammonium cryolite either in dry form or as obtained from the filtration in the form of a wet filter cake with an aqueous NaCl solution. The sodium chloride to be added in solution can be employed in stoichiometrical quantity, but for best results an excess, usually 40–50% by weight, or about 3–4.5 moles of NaCl per mole of ammonium cryolite, is utilized. The conversion or replacement reaction can be accomplished at any temperature below 100° C., but as the rate of conversion is dependent on the temperature, it was found that temperatures between 50–95° C. provide a sufficiently rapid rate of conversion, usually less than 4 hours for sodium cryolite yields in excess of 90%. The sodium cryolite will precipitate from the reaction mixture.

The produced sodium cryolite is then removed from the reaction mixture by conventional means, such as filtration or centrifugation. Although the purity of the sodium cryolite is satisfactory, for best results it should be washed to remove any traces of NaCl and/or $NH_4Cl$ which may have adhered to the surface or become occluded in the precipitate during sedimentation. The washed sodium cryolite is then dried, usually at temperatures between 100–140° C., to remove the water content. The dried sodium cryolite has a phosphatic impurity level of less than 0.02% by weight calculated as $P_2O_5$ and a siliceous impurity level less than 0.2% by weight calculated as $SiO_2$. The color of the product is white and is eminently suitable for immediate use as an electrolyte for the fused salt electrolysis of alumina.

In some instances it is desirable to calcine the dried sodium cryolite. Calcination at temperatures between 550–750° C. is usually accomplished by the flash calcination method. The calcination will reduce the already low $SiO_2$ content to lower levels, such as less than 0.07%, by the formation of $SiF_4$, which further improves the already high purity of the sodium cryolite produced in accordance with the process of the present invention.

As it was shown above, the method of the present invention provides white sodium cryolite of high purity without the necessity of acid addition to the reaction mixture prior to the formation of sodium cryolite. To further emphasize the advantages of the present invention, it will be shown below that addition of acid to obtain a final pH of less than 2 will not effect a change in the purity of the sodium cryolite made according to the method of the present invention.

TABLE 2

Effect of acid addition on the purity of sodium cryolite made according to the process of the invention and according to the prior art.

| AlF$_3$:HCl weight ratio | Novel process sodium cryolite, percent | | Prior art [1] sodium cryolite, percent | |
|---|---|---|---|---|
| | P$_2$O$_5$ | SiO$_2$ | P$_2$O$_5$ | SiO$_2$ |
| No acid | 0.01 | 0.04 | 0.72 | 0.74 |
| 50:1 | 0.01 | 0.05 | 0.30 | 0.60 |
| 36:1 | 0.01 | 0.20 | 0.52 | 0.65 |
| 12:1 | 0.01 | 0.23 | 0.30 | 0.17 |
| 3.6:1 | 0.01 | 0.01 | 0.05 | 0.63 |

[1] Ammonium cryolite not separated from mother liquor prior to metathesis with sodium chloride.

The following example is presented in order to afford a clearer understanding of the practice of the present invention, but it is understood it is illustrative only and there is no intention to limit the invention thereto.

EXAMPLE

An aqueous, impure fluosilicic acid ($H_2SiF_6$) solution containing about 15% by weight of $H_2SiF_6$ obtained from the den gases of the acidulation of phosphate rock was used for the production of aluminum fluoride ($AlF_3$). The phosphatic impurity level of the fluosilicic acid solution was about 4% by weight calculated as $P_2O_5$ (on the basis of 100% $H_2SiF_6$).

The aqueous fluosilicic acid solution was admixed with an amount of $Al_2O_3 \cdot 3H_2O$ which corresponded to the stoichiometrically required quantity. The admixture was kept under stirring for approximately 15 minutes at a temperature of about 90–100° C., during which period the formation of $AlF_3$ took place. The precipitated $SiO_2$ was removed by filtration and the filtrate containing the $AlF_3$ recovered.

The same impure $H_2SiF_6$ solution utilized for the production of $AlF_3$ was used for the production of $NH_4F$. The aqueous fluosilicic acid solution was admixed with an amount of aqueous $NH_4OH$, which corresponded to about a 10% excess over the stoichiometrically required quantity. The admixture was agitated and maintained at a temperature of about 60–70° C. for about 10 minutes, followed by cooling to about 35–40° C. The admixture was kept at this lower temperature for about 10 minutes without agitation. The precipitated $SiO_2$ was removed by filtration and the filtrate was purged with air to remove excess ammonia.

The filtrates containing the $AlF_3$ and the $NH_4F$ were then combined in a reaction vessel in a stoichiometric ratio of 1 mole of $AlF_3$ to 3 moles of $NH_4F$. The reaction vessel was kept under agitation for about 10–15 minutes. As the formation of ammonium cryolite is an exothermic reaction, the incoming streams were kept at a temperature of about 23–25° C., while during the reaction the temperature of the admixture rose to about 34–36° C. within the time period of agitation. The formed solid ammonium cryolite [$(NH_4)_3AlF_6$] was separated from the mother liquor by filtration and the filter cake was subjected to water washing which was repeated twice. A portion of the washed filter cake was dried at 110° C. to remove the moisture and analysed for $P_2O_5$, $SiO_2$ as well as for color. The analysis showed a $P_2O_5$ content of 0.01%, a $SiO_2$ content of 0.15% and the color of the ammonium cryolite was white without traces of any discoloration. The ammonium cryolite was recovered in a yield exceeding 92%.

The remaining portion of the wet filter cake was admixed with a 25% NaCl solution, containing a sodium chloride quantity equivalent to a 40% excess over the stoichiometric quantity required to convert all of the ammonium cryolite to sodium cryolite. The admixture was agitated and kept at about 85–95° C. for a time period of about less than 60 minutes. During this period substantially all of the ammonium cryolite was converted to sodium cryolite which precipitated in the reaction vessel. The sodium cryolite produced was filtered and washed to remove NaCl and $NH_4Cl$ adhered to the surface of the sodium cryolite. The product was dried at 110° C. and analysed for $P_2O_5$ and $SiO_2$. Analysis showed a 100% conversion, a $P_2O_5$ content of 0.01% by weight and a $SiO_2$ content of 0.1% by weight. A portion of the sodium cryolite was flash calcined at 650–700° C. and the product was again analysed providing a $P_2O_5$ content of 0.01% by weight and a $SiO_2$ content of 0.05% by weight, indicating that some of the $SiO_2$ impurity was removed by the formation of volatile $SiF_4$.

What is claimed is:

1. A method of producing synthetic sodium cryolite substantially free of discoloration and impurities from an aqueous, impure fluosilicic acid solution containing phosphatic impurities up to about 4% by weight based on 100% $H_2SiF_6$, which comprises:
   (a) admixing a first portion of fluosilicic acid solution with an $Al(OH)_3$ reactant in about the stoichiometric ratio and recovering an aqueous solution of $AlF_3$ by separating precipitated $SiO_2$,
   (b) admixing a second portion of fluosilicic acid solution with $NH_3$ in a mole ratio of 1 mole of fluosilicic acid to about 6–6.6 moles of $NH_3$, recovering an aqueous solution of $NH_4F$ by separating precipitated $SiO_2$ and removing from the aqueous solution any excess $NH_3$,
   (c) admixing the aqueous solutions of $AlF_3$ and $NH_4F$ in a mole ratio of one mole of $AlF_3$ to about 2.80–3.20 moles of $NH_4F$ and maintaining this admixture at a temperature between 25–90° C. for a time period sufficient to convert the $AlF_3$ and $NH_4F$ to solid ammonium cryolite,
   (d) separating the solid ammonium cryolite and washing the ammonium cryolite substantially free of adhering impurities,
   (e) admixing the washed ammonium cryolite with an aqueous solution of NaCl in a mole ratio of 1 mole of ammonium cryolite to about 3–4.5 moles of NaCl and maintaining this admixture at a temperature between 85–95° C. for a time period sufficient to convert the ammonium cryolite to sodium cryolite, and
   (f) recovering and drying the sodium cryolite containing less than 0.02% by weight of phosphatic impurities calculated as $P_2O_5$ and less than 0.2% by weight $SiO_2$.

2. The method of claim 1 wherein the admixture of $AlF_3$ and $NH_4F$ solutions is maintained at a temperature between 25–70° C. until substantially all the $AlF_3$ and $NH_4F$ are converted to solid ammonium cryolite.

3. Method of claim 2 wherein washed ammonium cryolite is maintained in admixture with the aqueous solution of NaCl until substantially all the ammonium cryolite is converted to sodium cryolite.

4. Method of claim 3 wherein the ammonium cryolite is washed at least twice with water before admixture with the NaCl solution.

5. Method of claim 3 wherein the ammonium cryolite is dried prior to admixture with the NaCl solution.

6. Method of claim 3 wherein the sodium cryolite is calcined at temperatures of from about 550 to 700° C. to reduce the $SiO_2$ content to less than 0.07% by weight.

References Cited

UNITED STATES PATENTS

| | | | |
|---|---|---|---|
| 2,141,773 | 12/1938 | Strathmeyer | 23—88 |
| 2,816,818 | 12/1957 | Gross | 23—88 |
| 2,916,352 | 12/1959 | Fitch et al. | 23—88 |
| 2,920,938 | 1/1960 | Matoush | 23—88 |
| 2,981,597 | 4/1961 | Tarbutton et al. | 23—88 |
| 3,024,086 | 3/1962 | Cines | 23—88 |
| 3,128,152 | 4/1964 | Secord et al. | 23—153 |
| 3,195,979 | 7/1965 | Burkert et al. | 23—153 |

EDWARD STERN, Primary Examiner

U.S. Cl. X.R.

23—182